July 4, 1933.  T. BODDE  1,916,653

DENTAL FLOSS HOLDER

Filed Sept. 23, 1931

INVENTOR
Theodore Bodde

Patented July 4, 1933

1,916,653

UNITED STATES PATENT OFFICE

THEODORE BODDE, OF ROCHESTER, NEW YORK

DENTAL FLOSS HOLDER

Application filed September 23, 1931. Serial No. 564,591.

The present invention relates to dental floss holding mechanism, and an object thereof is to provide for this purpose a small and handy device by means of which even those teeth which are far back in the mouth can be reached and cleaned in an easy way.

Another object is to stretch the dental floss between the extremes of two mechanical fingers in an automatic quick way. Still another object is to provide means for feeding the dental floss between these two mechanical fingers without requiring a long process of first untying the dental floss and retying it again.

To these and other ends, the invention consists of certain parts and combination of parts all of which will be hereinafter described, the novel features being pointed out in the appended claims.

In all the embodiments of the invention there is a part producing the holding in a stretched state of the dental floss, and a part holding the container of the dental floss.

Figure 1:
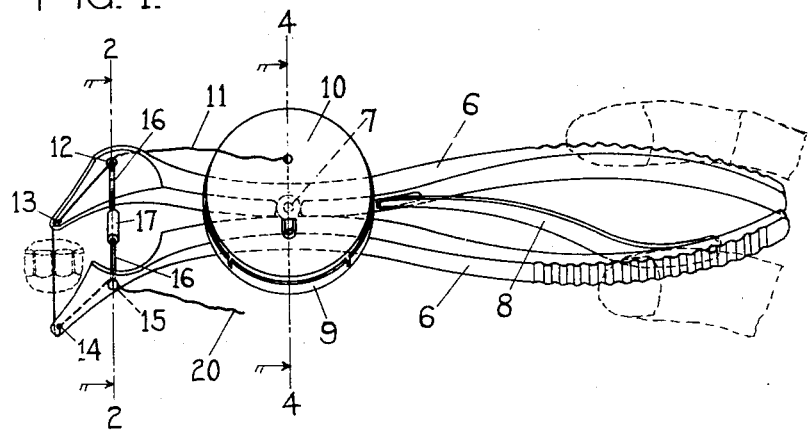
Figure 1 is a general perspective view showing the mechanism and way of using the device.

In Figure 1 is shown the device as containing basically of a pair of mechanically pivoted metal arms 6, 6. They are pivoted by means of a screw pivot 7 so that their extreme ends on the left separate when the arms are squeezed together. The squeezing together is done against the pressure of a spring 8. This part of the device is very similar to the nostril opening pliers used by surgeons.

Figure 2:
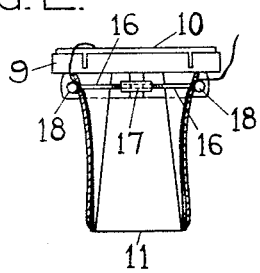
Figure 2 is a sectional view along the line 2—2 of Figure 1.

Over the pivot screw 7 and preferably held by it is a shallow metal box 9 with a thin springy rim for holding the dental floss container 10. From this container protrudes as usual the thread 11 of the dental floss. This thread is passed successively as shown through the four holes 12, 13, 14, and 15 which are in or near the extreme end of the device. The holes 13 and 14 are very small, just large enough for the dental floss to circulate freely through. The holes 12 and 15, however, are larger as through these holes must pass not only the dental floss but also the little metal rods 16 which are made into one rigid rod by means of a little metal sleeve 17. Their extremities end in small spherical heads 18 which are clearly shown in Figures 2, 3, and 5. These heads are too large to pass through the holes, so that for an extreme position of the two arms of the device, they squeeze tight against the openings of these holes, and the rod as that moment will limit the further going apart of the mechanical fingers. As the dental floss passes also through these openings it will be held tight between these openings and the little spherical heads of the rod when the two arms of the device are squeezed together. Naturally the part of the dental floss between the holes 13 and 14 will then be in a stretched state. That part is then ready to be pushed for cleansing purposes between the teeth of the mouth. The squeezing grip on the arms of the device makes this operation very handy.

Figure 3:
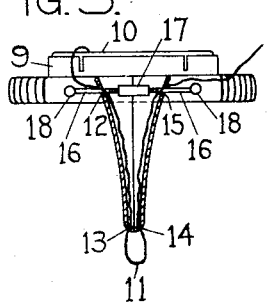
Figure 3 is a sectional view of the device also along the line 2—2 of Figure 1 but with the dental floss in the unstretched state.
Figure 4:
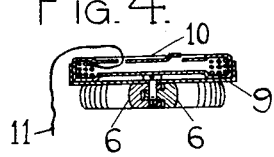
Figure 4 is a sectional view of the device along the line 4—4 of Figure 1.
Figure 5:
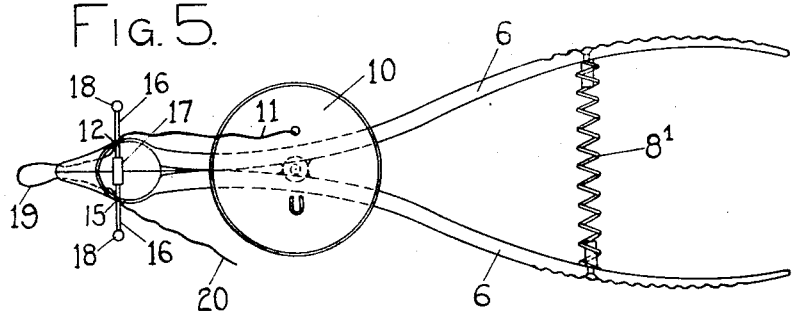
Figure 5 is a top view of the device with the dental floss in an unstretched state, and also illustrating a modified form of spring for biasing the gripping arms to their separated positions.

All one has to do to feed new dental floss between the holes 13 and 15 is to release this grip so that the spring 8 brings the two mechanical fingers together, as shown in Figures 3 and 5. A little slack 20 is then formed in the part of the dental floss between the two holes 13 and 14. By pulling by hand or future mechanical contrivance at the extreme end 20 of the dental floss, the above slack may be pulled out. Then when the arms of the device are squeezed together again, fresh dental floss will be pulled through the hole 13. This feeding can go on in this convenient way as much as one wishes by a few releases and new grips of the arms 6, 6. Figure 4 shows the detail of the box in which the dental floss container is being held. Preferably this box is fastened to the device as shown in Figure 4 by the same pivot screw on which the two arms 6, 6 are pivoted, but it is evident that this box may be fastened to one of the two arms in any other way. Glass containers of dental floss can be held by means of a longitudinal box instead of the circular box as represented. The modified form of the device shown in Figure 5 is exactly the same as that shown in Figure 1, with the exception that a compression coil spring $8^1$ is used in place of the leaf spring 8 shown in Figure 1.

Having thus shown and described one form of the invention, it is desired to be understood that the particular form illustrated has been selected to disclose the underlying principle of the invention rather than the exact construction to be employed in practicing the same, and it is further to be understood that various changes, modifications, and additions may be made without departing from the spirit or scope of the invention, except as demanded by the scope of the following claims:—

What I claim as my invention and desire to secure by Letters Patent is:—

1. In a dental floss holder, two pivoted arms, one dental floss threading hole in the extreme end of each arm, and one dental floss threading and gripping hole near the pivot in each arm.

2. In a dental floss holder, two pivoted arms and two dental floss threading holes in each arm, one for stretching and one for gripping the dental floss.

3. In a dental floss holder, two pivoted arms, a dental floss threading and stretching hole in the extreme end of each arm, a dental floss threading and gripping hole near the pivot in each arm, and an opening of arms limiting rod passing through these gripping holes.

4. In a dental floss holder, two pivoted arms, two holes in each arm for passage of dental floss, one of the two holes also for passage of a thread ending in two heads. These heads outside of the holes and gripping the dental floss between them and the holes when the thread is under tension.

5. In a dental floss holder, two pivoted arms, a hole in each arm for common passage of dental floss and of a thread ending in two heads which squeeze the dental floss against the edge of the hole at the limit of opening of the arms.

6. In a dental floss holder, two pivoted arms, two holes in each arm, a thread connecting the two arms by passage through one of these holes, a head larger than the hole at each end of the thread, these heads squeezing the dental floss and limiting the scope of opening of the arms.

7. In a dental floss holder, two pivoted arms, a dental floss gripping rod connecting these arms and a dental floss container box mounted on these arms.

8. In a dental floss holder, two pivoted arms, and bridging these arms a rod gripping the dental floss at the limit of opening of these arms.

9. In a dental floss holder, two pivoted arms, and a rod loosely carried by these arms, which rod grips dental floss and limits the opening of the arms.

10. In a dental floss holder, two pivoted arms, a dental floss gripping means, an opening of arms limiting rod, and a dental floss container box fastened to one of these arms.

11. In a dental floss holder, two pivoted arms, a rod connecting these arms by passage through a hole in each arm, dental floss passing through the same hole, and the two ends of the rod squeezing the dental floss at the limit of opening of the arms.

In testimony whereof I affix my signature.

THEODORE BODDE.